(12) United States Patent
Ito

(10) Patent No.: US 11,774,646 B2
(45) Date of Patent: Oct. 3, 2023

(54) DISPLAY DEVICE AND BACKLIGHT DEVICE

(71) Applicant: Funai Electric Co., Ltd., Osaka (JP)

(72) Inventor: Tatsuya Ito, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/846,714

(22) Filed: Jun. 22, 2022

(65) Prior Publication Data

US 2022/0413192 A1   Dec. 29, 2022

(30) Foreign Application Priority Data

Jun. 28, 2021 (JP) ................................. 2021-107030

(51) Int. Cl.
*G02B 5/02* (2006.01)
*G02F 1/13357* (2006.01)

(52) U.S. Cl.
CPC ........ *G02B 5/0278* (2013.01); *G02B 5/0205* (2013.01); *G02F 1/133605* (2013.01); *G02F 1/133611* (2013.01); *G02F 1/133603* (2013.01)

(58) Field of Classification Search
CPC ........ G02F 1/133603; G02F 1/133605; G02F 1/133606; G02F 1/133611; G02B 5/0278; G02B 5/0205; G02B 5/0268
See application file for complete search history.

(56) References Cited

U.S. PATENT DOCUMENTS

2012/0188759 A1* 7/2012 Sato .................. G02F 1/133603
362/230
2015/0261042 A1* 9/2015 Sugaya ............. G02F 1/133603
362/97.3
(Continued)

FOREIGN PATENT DOCUMENTS

CN    109581743 A   *  4/2019
EP    3 581 998 A1     12/2019
(Continued)

OTHER PUBLICATIONS

The extended European search report for the corresponding European application No. 22180927.0, dated Nov. 28, 2022.

*Primary Examiner* — Erin Kryukova
(74) *Attorney, Agent, or Firm* — Global IP Counselors, LLP

(57) ABSTRACT

A display device comprises a plurality of light sources, a luminance equalizer sheet and a display. The light sources include a plurality of first light sources arranged in an array on an arrangement region and a plurality of second light sources arranged at corner portions of the arrangement region, respectively. The luminance equalizer sheet is arranged opposite the light sources to equalize luminance, the luminance equalizer sheet including first portions that face the first light sources, respectively, and second portions that face the second light sources, respectively, the second portions being different from the first portions. The display is arranged opposite the luminance equalizer sheet and disposed on an opposite side of the luminance equalizer sheet relative to the light sources. The second portions of the luminance equalizer sheet form corner low transmittance areas with lower light transmittance than a portion of the luminance equalizer sheet other than the first portions and the second portions.

19 Claims, 10 Drawing Sheets

(56) References Cited

U.S. PATENT DOCUMENTS

| | | | |
|---|---|---|---|
| 2016/0077381 A1* | 3/2016 | Ma .................... | G02F 1/133606 |
| | | | 362/97.1 |
| 2018/0239197 A1* | 8/2018 | Yamano ............ | G02F 1/133611 |
| 2019/0049793 A1 | 2/2019 | Teragawa et al. | |
| 2019/0146279 A1* | 5/2019 | Tanikawa .......... | G02F 1/133605 |
| | | | 362/97.2 |
| 2019/0187520 A1* | 6/2019 | Chang ................ | G02F 1/133609 |
| 2020/0015367 A1* | 1/2020 | Zhang ................. | H05K 5/0017 |
| 2020/0379298 A1* | 12/2020 | Notoshi ............ | G02F 1/133603 |
| 2021/0026202 A1* | 1/2021 | Nam ................. | G02F 1/133609 |

FOREIGN PATENT DOCUMENTS

| | | |
|---|---|---|
| JP | 2013-143239 A | 7/2013 |
| WO | 2018147274 A1 | 8/2018 |
| WO | 2020/103386 A1 | 5/2020 |

* cited by examiner

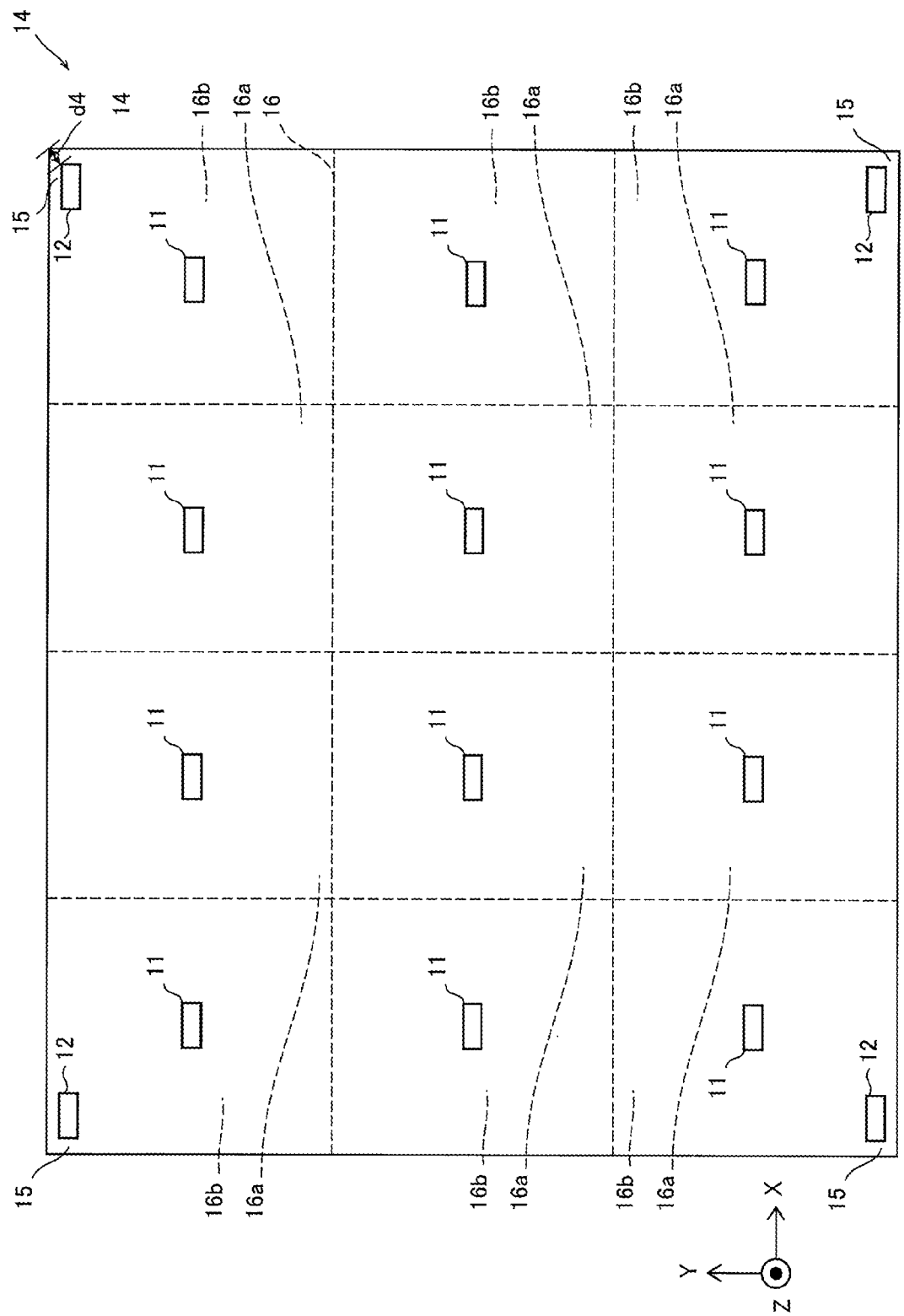

DISPLAY DEVICE AND BACKLIGHT DEVICE

CROSS-REFERENCE TO RELATED APPLICATIONS

This application claims priority to Japanese Patent Application No. 2021-107030 filed in Japan on Jun. 28, 2021. The entire disclosure of Japanese Patent Application No. 2021-107030 is hereby incorporated herein by reference.

BACKGROUND

Field of the Invention

This invention generally relates to a display device and a backlight device. More specifically, this invention relates to a display device and a backlight device with a plurality of light sources and a display.

Background Information

Generally, some display devices include a backlight device equipped with a plurality of light sources and a display (see, for example, Japanese Laid-Open Patent Application Publication No. 2013-143239 (Patent Literature 1)).

A liquid crystal display device (e.g., a display device) described in Patent Literature 1 above is equipped with an LED backlight device (e.g., a backlight device) and a liquid crystal panel (e.g., a display). The LED backlight device is a direct-lit type backlight device. The LED backlight device has a plurality of LED light sources (e.g., light sources) that are arranged in a planar configuration. With the LED backlight device, main LED light sources are arranged in a grid pattern on a mounting substrate. With the LED backlight device, secondary LED light sources are arranged at four corners of the mounting substrate. The secondary LED light sources are provided to brighten the corner portions, which tend to be dark in a direct-lit type LED backlight device. The secondary LED light sources are not used all the time, but are controlled to emit light only when necessary.

SUMMARY

Although not disclosed in Patent Literature 1 above, it is considered that, with LED backlight devices in liquid crystal display devices, the secondary LED light sources at the four corners are also configured to be all turned on when the main LED light sources are all turned on. When the main LED light sources and the secondary LED light sources are all turned on, the four corners of a display screen of the liquid crystal display device may become brighter than portions other than the four corners due to the light from the secondary LED light sources. In this case, it is difficult to achieve uniform luminance across the entire display screen of the display device. Therefore, it is desired to make the luminance uniform.

One object of this disclosure is to provide a display device and a backlight device capable of achieving uniform luminance even when light sources are further disposed at corners of an arrangement region of light sources that are arranged in an array.

In view of the state of the known technology, a display device according to a first aspect of this disclosure comprises a plurality of light sources including a plurality of first light sources arranged in an array on an arrangement region and a plurality of second light sources arranged at corner portions of the arrangement region, respectively, a luminance equalizer sheet arranged opposite the light sources to equalize luminance, the luminance equalizer sheet including first portions that face the first light sources, respectively, and second portions that face the second light sources, respectively, the second portions being different from the first portions, and a display arranged opposite the luminance equalizer sheet and disposed on an opposite side of the luminance equalizer sheet relative to the light sources, the second portions of the luminance equalizer sheet forming corner low transmittance areas with lower light transmittance than a portion of the luminance equalizer sheet other than the first portions and the second portions.

BRIEF DESCRIPTION OF THE DRAWINGS

FIG. 11 is a diagram showing an arrangement of a plurality of light sources according to a modification example.

DETAILED DESCRIPTION OF EMBODIMENTS

Figure 1:
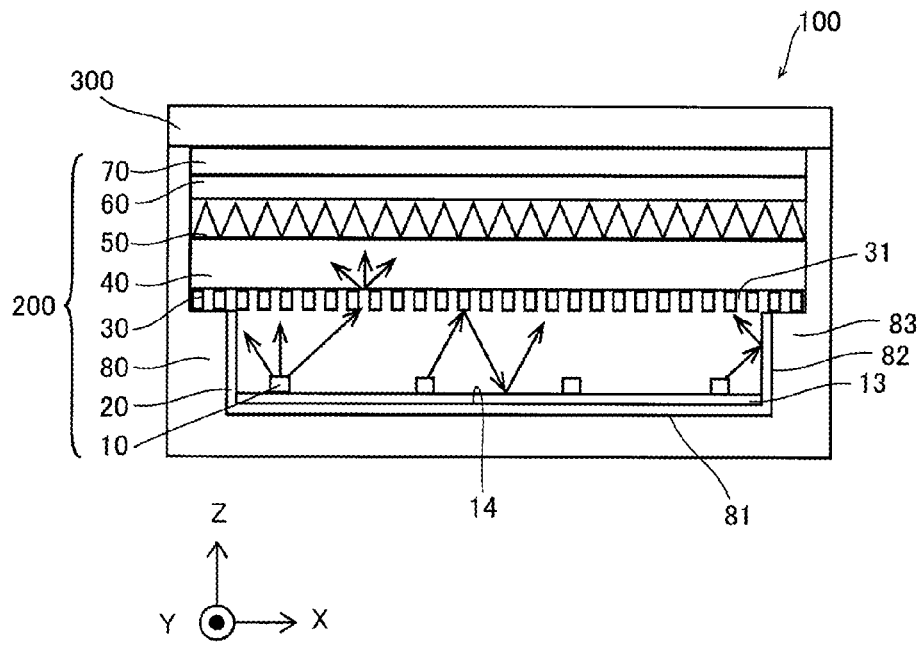
FIG. 1 is a cross-sectional view of a display device according to a first embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment (Configuration of Display Device Including Backlight Device)

Referring to FIGS. 1 to 5, the configuration of a display device 10 including a backlight device 200 according to an embodiment of the present invention will be described. In the drawings, the left and right direction as viewed from the front side of the display device 100 is shown as an X direction. The vertical direction as viewed from the front side of the display device 100 is shown as a Y direction. The direction connecting the rear side and the front side of the display device 100 is shown as a Z direction.

Figure 2:
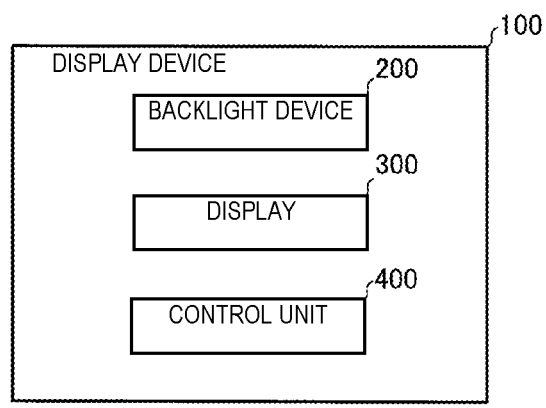
FIG. 2 is a block diagram of the display device according to the first embodiment.

As shown in FIG. 1, the display device 100 comprises the backlight device 200, a display 300 and a control unit or controller 400 (see FIG. 2). FIG. 1 is a cross-sectional view of the display device 100 taken along the X direction.

The backlight device 200 comprises a plurality of light sources 10, a reflective sheet 20, a luminance equalizer sheet 30, a diffuser plate 40, a prism sheet 50, a polarizing sheet 60, an optical sheet 70, and a frame 80. With the backlight device 200, the reflective sheet 20, the light sources 10, the luminance equalizer sheet 30, the diffuser plate 40, the prism sheet 50, the polarizing sheet 60 and the optical sheet 70 are arranged in this order inside of the frame 80.

Figure 3:
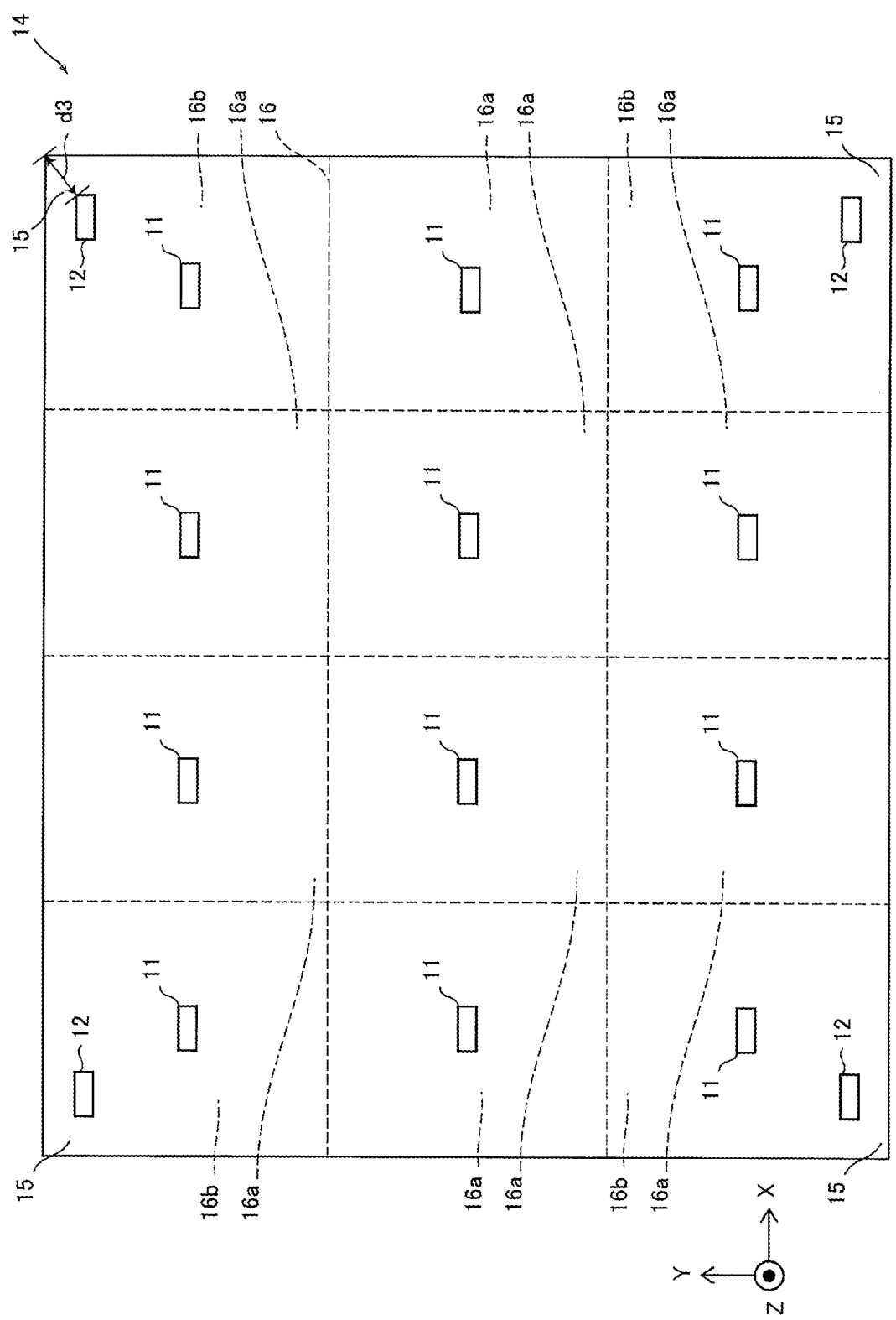
FIG. 3 is a diagram showing an arrangement of a plurality of light sources according to the first embodiment.

As shown in FIG. 3, the light sources 10 include a plurality of first light sources 11 and a plurality of second light sources 12. The first light sources 11 are arranged in an array in an arrangement region 14 formed on the entire inner bottom surface of the frame 80. Specifically, the frame 80 has the inner bottom surface 81 (e.g., the bottom surface) that defines the arrangement region 14. The first light sources 11 are arranged in a two-dimensional array or matrix. In particular, the first light sources 11 are arranged in rows along the X direction and columns along the Y direction. In the illustrated embodiment, twelve first light sources 11 are arranged in three by four matrix, but the numbers of the first light sources 11 can be different, as needed and/or desired. In FIG. 3, the arrangement region 14 is shown as a solid rectangle (rectangle forming an outer periphery). In this embodiment, the arrangement region 14 has a rectangular shape in a plan view. The first light sources 11 are arranged in a grid-like arrangement in the X direction and the Y direction in the arrangement region 14. The first light sources 11 are provided on a substrate 13 (see FIG. 1). The first light sources 11 includes light emitting elements. The first light sources 11 are configured to emit light when energized. The first light sources 11 are configured such that the luminance is adjusted by a current value. The first light sources 11 include LEDs (Light Emitting Diodes).

The second light sources 12 are located at corner portions 15 of the arrangement region 14, respectively. In the illustrated embodiment, four second light sources 12 are arranged at four corner portions 15 of the arrangement region 14, respectively, but the number of second light sources 12 can be different, as needed and/or desired. The corner portions 15 are located outside of the first light sources 11 closest to the corners in the corners of the arrangement region 14 and are portions in the vicinities of the corners. In this embodiment, the corner portions 15 are located outside of the first light sources 11 closest to the four corners in the four corners of the arrangement region 14, respectively, and are portions in the vicinities of the four corners. The second light sources 12 are disposed at the corner portions 15, respectively, that are formed in the four corners of the arrangement region 14, respectively. The second light sources 12 are disposed closer to the four corners of the arrangement region 14 than the first light sources 11. Thus, the second light sources 12 are located outward relative to the first light sources 11 with respect to the center of the display device 10 or the center of the arrangement region 14. The second light sources 12 are provided on the substrate 13 (see FIG. 1). The second light sources 12 include light emitting elements. The second light sources 12 are configured to emit light when energized. The second light sources 12 are configured such that the luminance is adjusted by a current value. The second light sources 12 include LEDs (Light Emitting Diodes). The second light sources 12 are configured to be driven by the same current value as the first light sources 11. Specifically, the second light sources 12 are configured by the LEDs with the same specifications as those of the first light sources 11. Thus, the light sources 10 (i.e., the first light sources 11 and the second light sources 12) are formed by the same LEDs.

The arrangement region 14 is divided into a plurality of divided regions 16. The plurality of the divided regions 16 have the substantially same shape. The plurality of the divided regions 16 are centered on the respective positions of the first light sources 11, respectively. Thus, the arrangement region 14 includes the plurality of the divided regions 16. In this embodiment, as shown in FIG. 3, the arrangement region 14 is divided into twelve rectangular divided regions 16 (partitioned by dashed lines in FIG. 3). The plurality of the divided regions 16 are configured such that each of the divided regions is controlled by the control unit 400 (see FIG. 2) as a unit. The arrangement region 14 includes a plurality of first divided regions 16a that do not include the corner portions 15 and a plurality of second divided regions 16b that include the corner portions 15, respectively. In the illustrated embodiment, as seen in FIG. 3, the divided regions 16 include eight first divided regions 16a and four second divided regions 16b corresponding to the four corner portions 15. In the first divided regions 16a, the first light sources 11 are disposed, but the second light sources 12 are not disposed. In the second divided regions 16b, the first light sources 11 are disposed, and the second light sources 12 are disposed. In other words, the first light sources 11 are arranged on the divided regions 16 (i.e., the first divided regions 16a and the second divided regions 16b), respectively, while the second light sources 11 are arranged in the second divided regions 16b, respectively. Specifically, as seen in FIG. 3, each of the first light sources 11 is arranged at the center of the respective one of the divided regions 16 (i.e., the first divided regions 16a and the second divided regions 16b), while each of the second light sources 12 is offset from the center of the respective one of the second divided regions 16b. The divided regions 16 are, for example, regions having an area obtained by equally dividing the inner bottom surface 81 of the frame 80 (see FIG. 1) by the number of the first light sources 11. The divided regions 16 are provided corresponding to the number of the first light sources 11. The shape of the divided regions 16 are not limited to a rectangle, but may be, for example, a square, a triangle, a pentagon or larger polygon, a circle or an oval.

As shown in FIG. 1, the reflective sheet 20 is located on the inner bottom surface 81 and side surfaces 82 of the frame 80. The reflective sheet 20 reflects the light that has been reflected in the area of the luminance equalizer sheet 30 where through holes 31 are not formed toward the luminance equalizer sheet 30. The reflective sheet 20 also reflects the light emitted from the light sources 10 toward the side surfaces 82 of the frame 80 toward the luminance equalizer sheet 30. The reflective sheet 20 is made of resin.

The luminance equalizer sheet 30 is disposed between the reflective sheet 20 and the diffuser plate 40. The luminance equalizer sheet 30 is used to uniform the luminance distribution, thereby equalizing the luminance on the entire display screen. The luminance equalizer sheet 30 has a plurality of through holes 31 for transmitting light emitted from the plurality of the light sources 10. The luminance equalizer sheet 30 transmits the light from the light sources 10 and the light reflected by the reflective sheet 20 in the area where the through holes 31 are formed. The luminance equalizer sheet 30 reflects the light from the light sources 10 and the light reflected by the reflective sheet 20 in the area where the through holes 31 are not formed toward the reflective sheet 20. In this embodiment, the plurality of the through holes 31 are linearly aligned in the direction (the X direction and the Y directions) along which the plurality of the light sources 10 are aligned (the X direction and the Y directions) (see FIG. 4). In other words, the through holes 31 are arranged in an array. In particular, the through holes 31 are arranged in a two-dimensional array or matrix. In the illustrated embodiment, the through holes 31 are arranged in thirty-three by forty matrix, but the numbers of the through holes 31 can be different, as needed and/or desired. The plurality of the through holes 31 are formed by a drill or other tool. The plurality of the through holes 31 penetrate the luminance equalizer sheet 30 in the thickness direction (the Z direction).

The shape of the luminance equalizer sheet 30 is designed to match the shape of the frame 80. In this embodiment, the luminance equalizer sheet 30 is rectangular in shape. As shown in FIG. 1, the area of the luminance equalizer sheet 30 is larger than the inner bottom surface 81 of the frame 80. The peripheral edge portion of the luminance equalizer sheet 30 is placed on a protrusion 83 provided on the inner surface of the frame 80. The luminance equalizer sheet 30 is made of a resin having light reflecting properties. The luminance equalizer sheet 30 is formed, for example, of a microcellular foamed polyethylene terephthalate.

Figure 4:
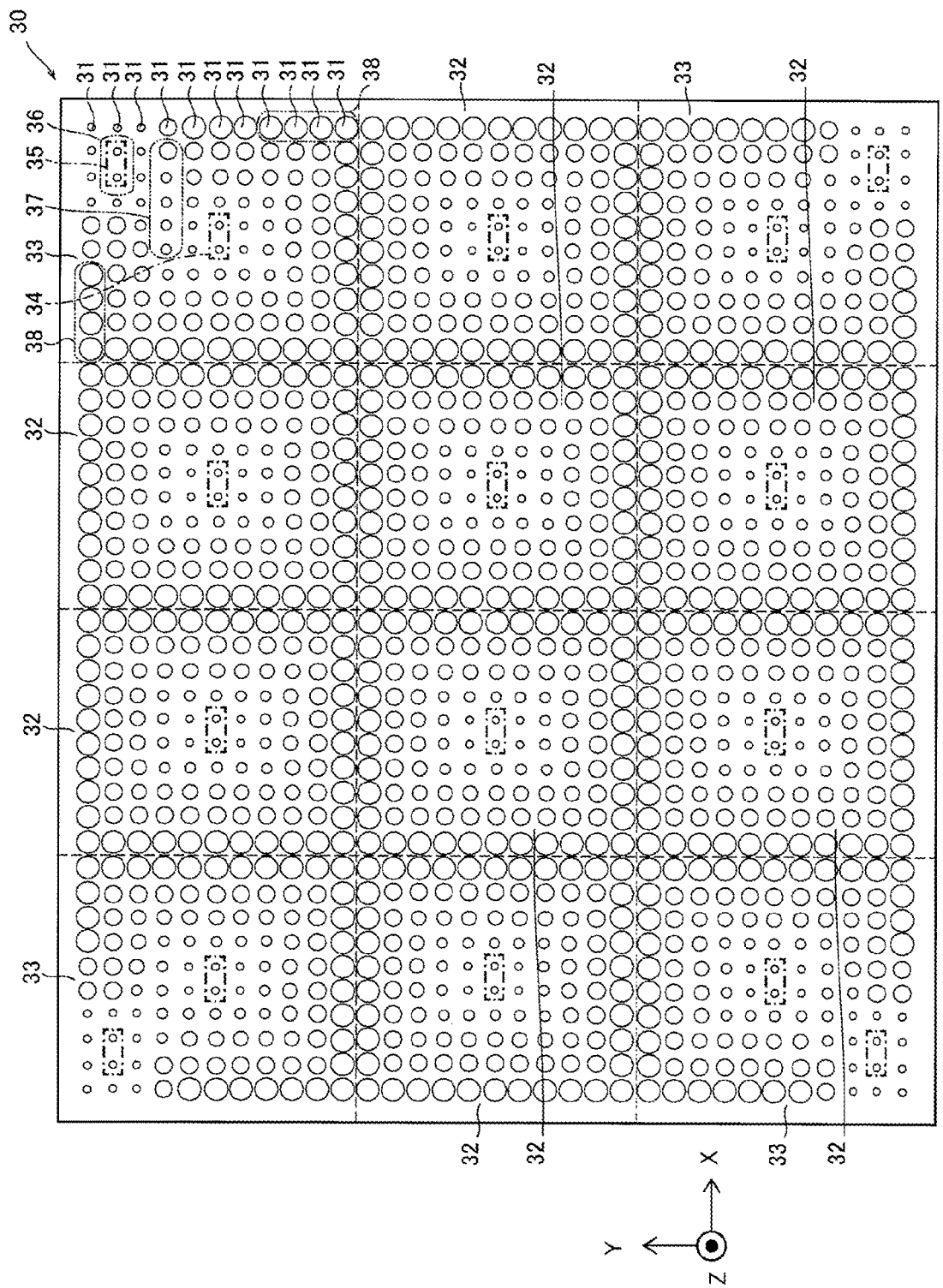
FIG. 4 is a diagram showing a luminance equalizer sheet according to the first embodiment.

As shown in FIG. 4, the luminance equalizer sheet 30 has a plurality of sheet first regions 32 and a plurality of sheet second regions 33. The sheet first regions 32 are arranged opposite the first divided regions 16a (see FIG. 3), respectively, on which only the first light sources 11 (see FIG. 3) are disposed, respectively. The sheet second regions 33 are arranged opposite the second divided regions 16b (see FIG. 3), respectively, on which the first light sources 11 (see FIG. 3) and the second light sources 12 (see FIG. 3) are disposed, respectively. Thus, the sheet first regions 32 are portions of the luminance equalizer sheet 30 corresponding to the first divided regions 16a, while the sheet second regions 33 are portions of the luminance equalizer sheet 30 corresponding to the second divided regions 16b. As seen in FIG. 4, the luminance equalizer sheet 30 has eight sheet first regions 32 and four sheet second regions 33. In FIG. 4, the sheet first regions 32 and the sheet second regions 33 are shown by dashed rectangles. In FIG. 4, the areas of the luminance equalizer sheet 30 opposite the first light sources 11 and the second light sources 12 are shown by dash-dotted lines. Specifically, the luminance equalizer sheet 30 includes a plurality of first portions 34 that face the first light sources 11, respectively, and a plurality of second portions 35 that face the second light sources 12, respectively. As seen in FIG. 4, the luminance equalizer sheet 30 includes twelve first portions 34 located in the sheet first regions 32 and the sheet second regions 33, and four second portions 35 located in the sheet second regions 34.

In the sheet first regions 32 of the luminance equalizer sheet 30, the hole diameters of the plurality of the through holes 31 are set according to the distance from the respective first light source 11. In the sheet first regions 32, the hole diameters of the plurality of the through holes 31 are configured such that the diameters overall increase from a position closer to the respective first light source 11 to a position farther away. In particular, in each of the sheet first regions 32, the hole diameter of the through holes 31 increases as moving away from the respective one of the first portions 34. The hole diameters of the plurality of the through holes 31 in the sheet second regions 33 of the luminance equalizer sheet 30 are described below. In this disclosure, the hole diameters of the through holes 31 refer to the diameters of the through holes 31. The minimum value of the hole diameters of the through holes 31 is set at 0.35 mm, for example. The maximum value of the hole diameters of the through holes 31 can be suitably set as long as the size of the sheet portions between adjacent through holes 31 (i.e., the distance between adjacent through holes 31) is set at at least 0.2 mm.

The sheet second regions 33 of the luminance equalizer sheet 30 include the first portions 34 that face the first light sources 11 (see FIG. 3) closest or adjacent to the second light sources 12 (see FIG. 3) and the second portions 35 that face the second light sources 12 (see FIG. 3) and are different from the first portion 34. The second portions 35 form corner low transmittance areas 36 with lower light transmittance than portions of the luminance equalizer sheet 30 other than the first portions 34 that are closest or adjacent to the second portions 35, respectively, and the second portions 35. The second portions 35 are also arranged relative to each other through high transmittance areas 37 that are located between the first portions 34 and the second portions 35 and have higher light transmittance than the second portions 35. The second portions 35 are also formed to have lower light transmittance than that of portions 38 of the luminance equalizer sheet 30 facing edges or portions of the second divided regions 16b (see FIG. 3) that are located opposite to the corner portions 15 along edges of the arrangement region 14 (see FIG. 3). The portions 38 facing the edges that are located opposite to the corner portions 15 (see FIG. 3) are formed at portions facing the edges that are located opposite to the corner portions 15 in the X direction and at portions facing the edges that are located opposite to the corner portions 15 in the Y direction.

Figure 5:
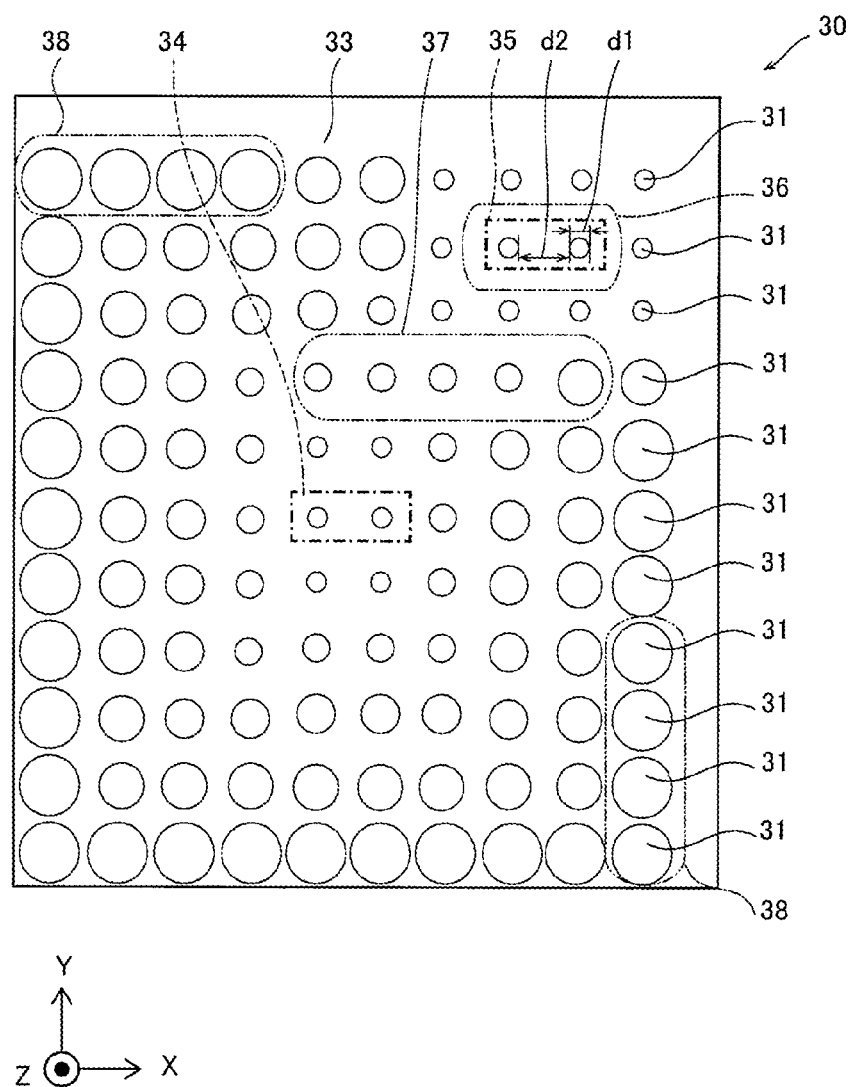
FIG. 5 is a diagram showing an example of a sheet second region according to the first embodiment.

As shown in FIG. 5, the corner low transmittance areas 36 are configured such that an aperture ratio of the through holes 31 is smaller than that of the high transmittance areas 37. For example, the corner low transmittance areas 36 are configured such that a hole diameter d1 of the through holes 31 is smaller than in the high transmittance areas 37, the corner low transmittance areas 36 are configured such that a distance d2 between adjacent through holes 31 is larger than in the high transmittance areas 37, or the corner low transmittance areas 36 are configured such that the hole diameter d1 of the through holes 31 is smaller and the distance d2 between adjacent through holes 31 is larger than in the high transmittance areas 37. In this embodiment, the corner low transmittance areas 36 are configured such that the hole diameter d1 of the through holes 31 is smaller and the distance d2 between adjacent through holes 31 is larger than in the high transmittance areas 37. In FIG. 5, one of the sheet second regions 33 is shown as an example. The distance d2 between adjacent through holes 31 means the distance between adjacent through holes 31 at the position where the adjacent through holes 31 are closest to each other. Specifically, in the illustrated embodiment, as seen in FIGS. 4 and 5, in each of the sheet second regions 33, the hole diameter of the through holes 31 increases as moving away from the respective one of the first portions 34, except for an area around the respective one of the second portions 35. In particular, as seen in FIG. 5, the hole diameter of the through holes 31 in an upper-right corner area of the sheet second region 33 that includes twelve through holes 31 arranged in three by four matrix is smaller than that of the through holes 31 that are adjacent to this upper-right corner area in the X direction and in the Y direction. Thus, in the sheet second region 33 shown in FIG. 5, the hole diameter of the through holes 31 increases as moving away from the first portions 34, except for this upper-right corner area.

As shown in FIG. 1, the diffuser plate 40 is disposed between the luminance equalizer sheet 30 and the prism sheet 50. The diffuser plate 40 radially scatters the light transmitted through the through holes 31 of the luminance equalizer sheet 30. The diffuser plate 40 is made, for example, of polycarbonate.

The prism sheet 50 is disposed between the diffuser plate 40 and the polarizing sheet 60. The prism sheet 50 refracts the light scattered by the diffuser plate 40 in a certain direction to focus it. The prism sheet 50 is shaped like a series of triangular prisms in a horizontal direction. The prism sheet 50 is made, for example, of acrylic resin.

The polarizing sheet 60 is disposed between the prism sheet 50 and the optical sheet 70. The polarizing sheet 60 transmits light having a predetermined direction out of the light focused by the prism sheet 50 and reflects other light. Specifically, the polarizing sheet 60 reflects light having a direction to be absorbed by the display 300 and transmits light having a direction not to be absorbed.

The optical sheet 70 is disposed between the polarizing sheet 60 and the display 300. The optical sheet 70 blocks light that enters the polarizing sheet 60 at an angle relative to the optical sheet 70 out of the light transmitted through the polarizing sheet 60. The optical sheet 70 is, for example, a louver sheet.

The frame 80 has a box shape with an opening on the front side. In this embodiment, the inner bottom surface 81 of the frame 80 is rectangular in shape.

The display 300 is disposed on the optical sheet 70 side of the backlight device 200. The display 300 is, for example, a liquid crystal panel. The display 300 includes a plurality of pixels. The display 300 displays an image by changing the transmittance of light emitted from light sources by each of the plurality of pixels. The display 300 is driven based on video signals. The display 300 includes a polarizer and a liquid crystal cell.

The control unit or controller 400 shown in FIG. 2 performs the local dimming control. In the illustrated embodiment, the control unit or controller 400 is a hardware device capable of executing a software program, and does not include a human. In the illustrated embodiment, the control unit 400 includes an electronic controller or processor, such as a CPU (Central Processing Unit). However, in some cases, the control unit 400 can be configured to comprise, instead of the CPU or in addition to the CPU, programmable logic devices such as a DSP (Digital Signal Processing or Processor), an FPGA (Field Programmable Gate Array), and the like. In addition, the control unit 400 can include a plurality of processors or CPUs that execute the processing sequences of the present disclosure together. Specifically, the control unit 400 controls, according to the luminance of the input image data for each of the divided regions 16, turning on and off of the first light sources 11 of the backlight device 200 or the light intensity of the first light sources 11, and controls turning off of the second light sources 12. For example, when turning on a first light source 11 in a second divided region 16b by the local dimming control, the control unit 400 is configured not to turn on a second light source 12 arranged in the second divided region 16b in which the first light source 11 to be turned on is arranged. The control unit 400 also controls on/off of performing of the local dimming (i.e., a turning on control (or an on control) of the local dimming and a turning off control (or an off control) of the local dimming).

Figure 6:
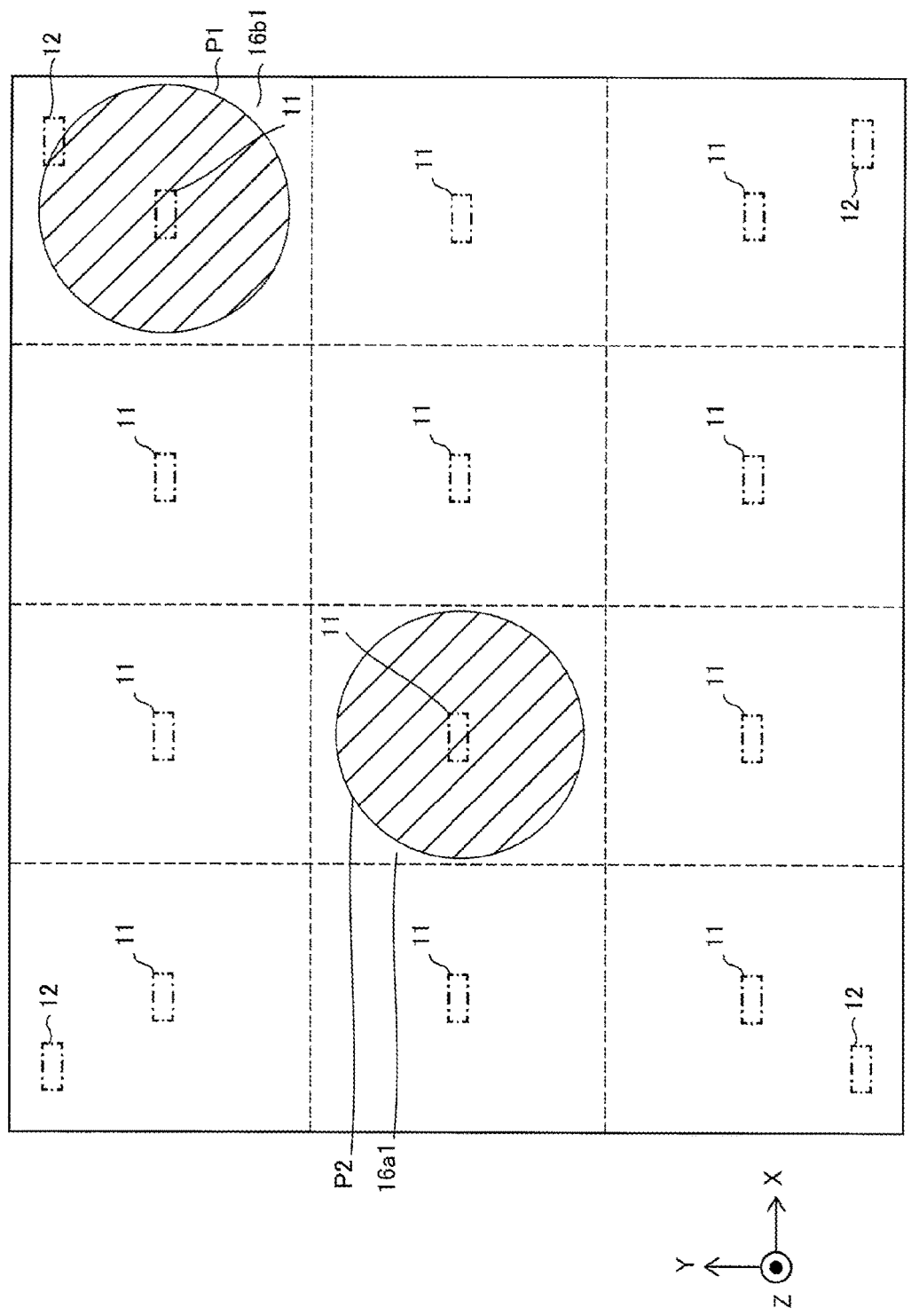
FIG. 6 is a diagram showing an example of a luminance distribution pattern on a display screen of the display device according to the first embodiment.

FIG. 6 is a diagram showing an example of a luminance distribution pattern (hatched area) on the display screen of the display device 100 according to this embodiment. In FIG. 6, the areas corresponding to the first light sources 11 and the second light sources 12 are indicated by dash-dotted lines. The areas corresponding to the divided regions 16 (see FIG. 3) are also shown and partitioned by dashed lines. In the example shown in FIG. 6, by the local dimming control by the control unit 400, the first light source 11 in the second divided region 16b1 is turned on and the second light source 12 is not turned on. In addition, by the local dimming control by the control unit 400, the first light source 11 in the first divided region 16a1 is turned on. In this embodiment, as shown in FIG. 6, when the first light source 11 in the second divided region 16b1 is turned on by the local dimming control, the second light source 12 disposed in the second divided region 16b1 including the first light source 11 to be turned on is not turned on, and thus a luminance distribution pattern P1 in the second divided region 16b1 in which the first light source 11 is turned on and the second light source 12 is not turned on and a luminance distribution pattern P2 in the first divided region 16a1 in which the first light source 11 is turned on can be made substantially equal to each other. For example, the control unit 400 is configured to turn off the second light source 12 in the second divided region 16b1 in response to turning on the first light source 11 in the second divided region 16b1 by the local dimming control (i.e., by the on control of the local dimming control or while performing the local dimming control).

Figure 7:
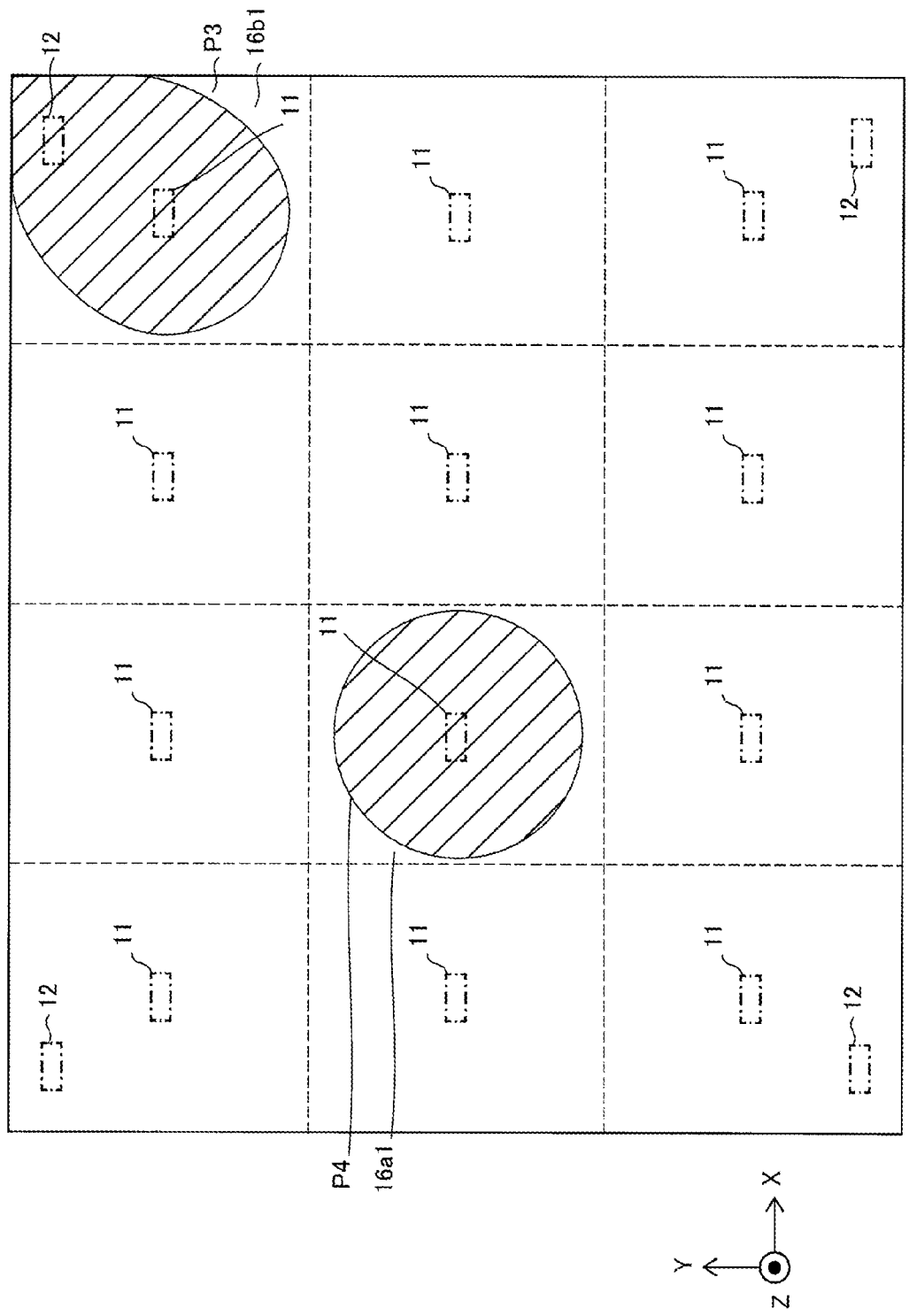
FIG. 7 is a diagram showing an example of a luminance distribution pattern on a display screen of a display device according to a comparative example.

In contrast, as in the comparative example shown in FIG. 7, when the first light source 11 in the second divided region 16b1 is turned on and the second light source 12 disposed in the second divided region 16b1 including the first light source 11 to be turned on is also turned on by the local dimming control, a luminance distribution pattern P3 in the second divided region 16b1 in which the first light source 11 and the second light source 12 are turned on and a luminance distribution pattern P4 in the first divided region 16a1 in which the first light source 11 is turned on will be different from each other. Specifically, the luminance distribution pattern P3 in the second divided region 16b1 in which the first light source 11 and the second light source 12 are turned on shows a pattern caused by the emission of the second light source 12.

In addition, in the illustrated embodiment, when the light sources 10 in the second divided regions 16b are turned on while the local dimming is turned on by the control unit 400, the second light sources 12 in the second divided regions 16b are not turned on and only the first light sources 11 in the second divided regions 16b are turned on. On the other hand, when the light sources 10 in the second divided regions 16b are turned on while the local dimming is turned off by the control unit 400, the first light sources 11 and the second light sources 12 in the second divided regions 16b are both turned on. Here, the turning off control of the local dimming referrers to a control in which all of the first light sources 11 are turned on at a constant luminance (at a predetermined luminance when local dimming is not performed). During the turning off control of the local dimming (i.e., while the local dimming is not performed), the control of turning on and off the first light source 11 for each of the divided regions 16 in the arrangement region 14 is not performed, and thus the divided regions 16 do not need to be considered or exist.

Figure 8:
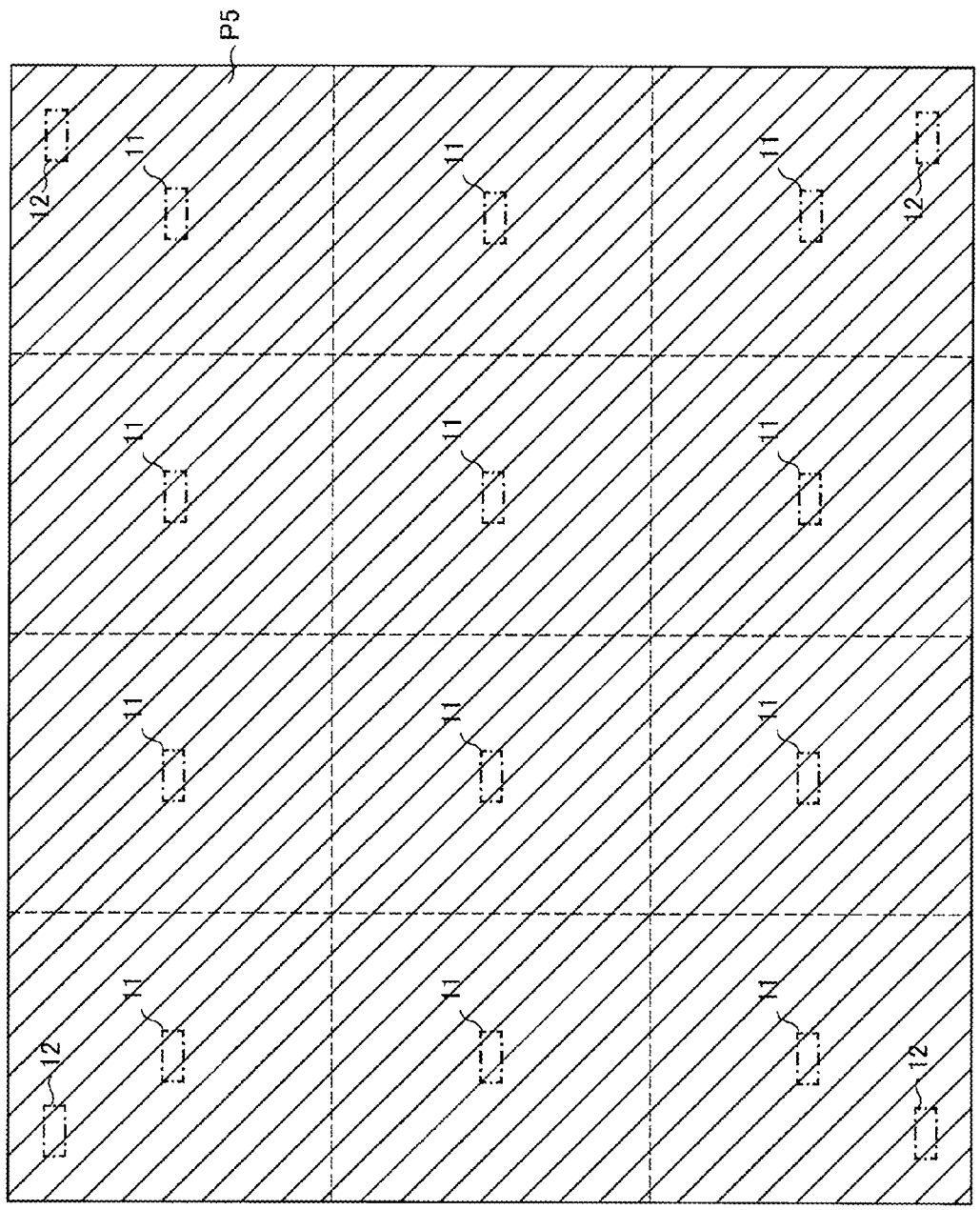
FIG. 8 is a diagram showing a luminance distribution pattern on the entire display screen of the display device according to the first embodiment.

FIG. 8 is a diagram showing a luminance distribution pattern (hatched areas) on the entire display screen of the display device 100 according to this embodiment. In FIG. 8, the areas corresponding to the first light sources 11 and the second light sources 12 are indicated by dash-dotted lines. The areas corresponding to the divided regions 16 (see FIG.

3) are shown and partitioned by dashed lines. By the turning off control of the local dimming by the control unit 400, the first light sources 11 and the second light sources 12 are all turned on. In this embodiment, as shown in FIG. 8, when all of the first light sources 11 are turned on and all of the second light sources 12 are turned on by turning off control of the local dimming, a luminance distribution pattern P5 across the entire display screen of the display device 100 can be made substantially uniform by the luminance equalizer sheet 30 including the corner low transmittance areas 36.

Figure 9:
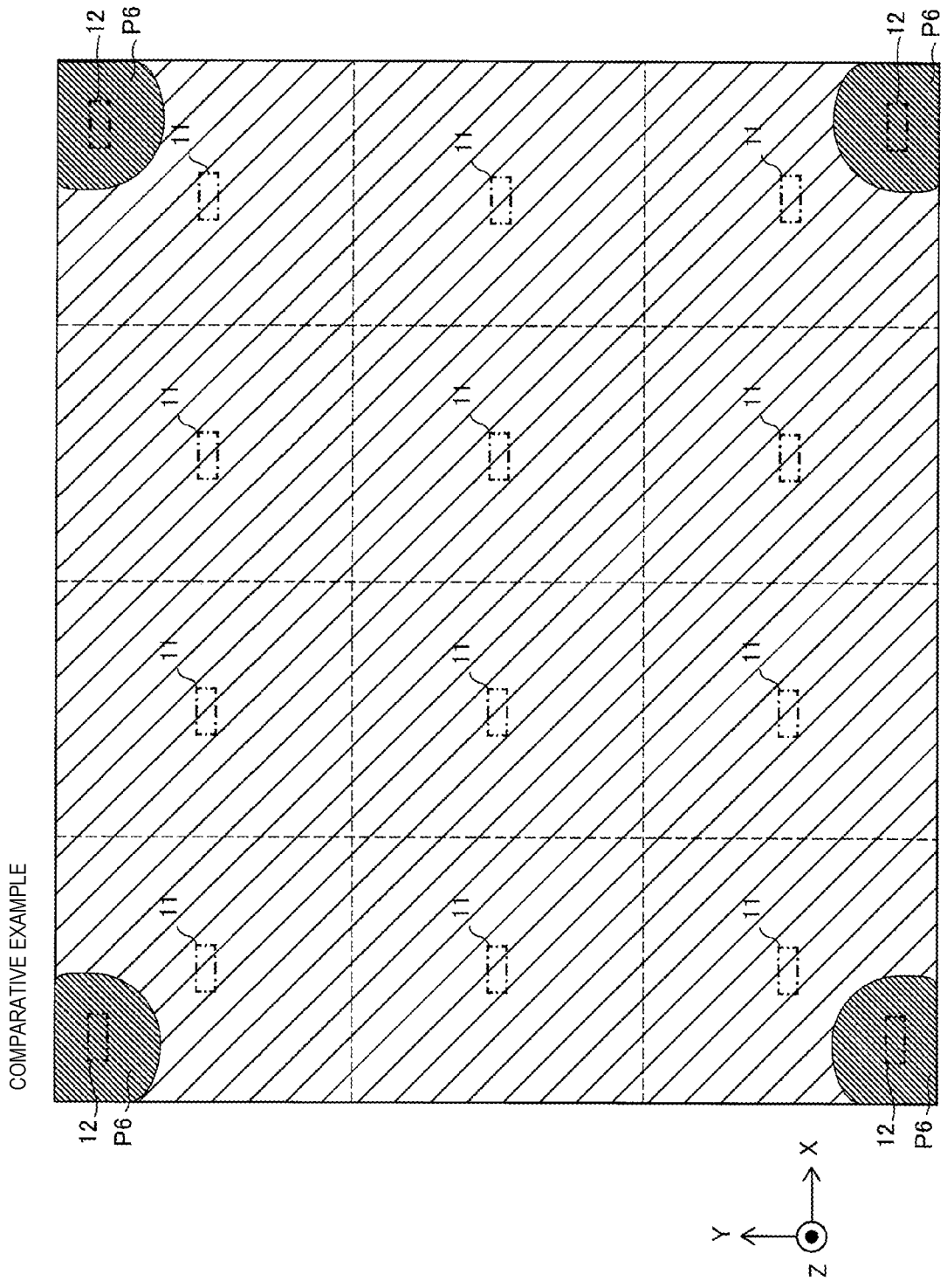
FIG. 9 is a diagram showing a luminance distribution pattern on the entire display screen of the display device according to the comparative example.

In contrast, according to the configuration of the comparative example that does not use the luminance equalizer sheet 30 including the corner low transmittance areas 36 according to this embodiment, as shown in FIG. 9, when all of the first light sources 11 are turned on and all of the second light sources 12 are turned on by turning off control of the local dimming, the luminance distribution pattern across the entire display screen of the display device 100 is not uniform. Specifically, the luminance distribution pattern is shown as a pattern P6 in which the luminance in the second portions 35 becomes larger due to the emission of the second light sources 12 in the second portions 35.

The control unit 400 also performs a control to correct the amount of light transmitted from the backlight device 200 for each pixel of the display 300 according to the input image data based on a luminance correction map (not shown) obtained in advance. Specifically, the control unit 400 is configured to, based on the luminance correction map, apply a voltage to the liquid crystal cells of the display 300 to change the orientation of the liquid crystal molecules, and to adjust luminance by changing the transmittance of light in combination with the direction of the liquid crystal molecules and the polarizing plate.

The luminance correction map is obtained by the control unit 400 based on the difference or ratio of the luminance distribution pattern in the divided regions 16 in which the first light sources 11 are turned on by the local dimming control and the desired luminance distribution pattern in the divided regions 16. In this embodiment, as shown in FIG. 6, the luminance distribution pattern P1 in the second divided region 16b in which the first light source 11 is turned on and the second light source 12 is not turned on and the luminance distribution pattern P2 in the first divided region 16a in which the first light source 11 is turned on are substantially equal to each other. Therefore, the luminance correction map for each of the divided regions 16 can be shared. In other words, the control unit 400 does not need to obtain a luminance correction map for each of the divided regions 16. The luminance correction map is not limited to the above.

The control unit 400 can also include, in addition to the CPU, a ROM (Read Only Memory), a RAM (Random Access Memory), etc.

Effects of First Embodiment

In the first embodiment, the following effects can be obtained.

In the first embodiment, as described above, with the display device 100, the second portions 35 of the luminance equalizer sheet 30 form the corner low transmittance areas 36 with lower light transmittance than the portions of the luminance equalizer sheet 30 other than the first portions 34 that are closest or adjacent to the second portions 35, respectively, and the second portions 35. With this configuration, the amount of light transmitted through the second portions 35 facing the second light sources 12 can be adjusted. Therefore, the luminance distribution can be adjusted uniformly by the luminance equalizer sheet 30. As a result, the luminance can be made uniform even when the second light sources 12 are further placed in the corners of the arrangement region 14 on which the light sources 11 are arranged in an array.

In the first embodiment, as described above, the second portions 35 of the luminance equalizer sheet 30 are arranged relative to each other through the high transmittance areas 37 that are located between the first portions 34 and the second portions 35 and have higher light transmittance than the second portions 35. With this configuration, the luminance distribution can be adjusted more uniformly by the corner low transmittance areas 36 of the second portions 35 and the high transmittance areas 37 located between the first portions 34 and the second portions 35.

In the first embodiment, as described above, the control unit 400 is further provided that is configured to control emission of light from the light sources 10, the arrangement region 14 being divided into the plurality of the divided regions 16 of the substantially same shape, the divided regions 16 including the first divided regions 16a that do not include the corner portions 15, and the second divided regions 16b that include the corner portions 15, respectively, the first light sources 11 being arranged on the first divided regions 16a and the second divided regions 16b, respectively, the second light sources 12 being arranged on the second divided regions 16b, respectively, when turning on a first light source 11 in a second divided region 16b by local dimming control, the control unit 400 being configured not to turn on a second light source 12 arranged on the second divided region 16b in which the first light source 11 to be turned on is arranged. Here, local dimming is a technique that divides the entire screen of the display device 100 into multiple divided regions 16 and controls the backlight device 200 according to the luminance of the input image data for each divided region. If it is configured so that a second light source 12 in a second divided region 16b is not turned on when a first light source 11 in the second divided region 16b is turned on by the local dimming control, it is possible to suppress the difference between the luminance distribution pattern in the second divided region 16b in which the first light source 11 is turned on by the local dimming control and the luminance distribution pattern in a first divided region 16a that does not include the corner portions 15 and in which a first light source 11 is turned on by the local dimming control. Since the local dimming control, for example, does not turn on the light sources 10 in the divided regions 16 corresponding to the display screen areas to be displayed in black, luminance uniformity across the entire display screen is not required during the local dimming control. Therefore, there is no problem even if a second light source 12 in a second divided region 16b is not turned on when a first light source 11 in the second divided region 16b is turned on by the local dimming control.

In the first embodiment, as described above, the control unit 400 is configured to turn on all of the second light sources 12 when turning on all of the first light sources 11 by an off control of the local dimming control. With this configuration, the luminance distribution can be adjusted more uniformly when the local dimming is off.

In the first embodiment, as described above, the luminance distribution pattern P1 in the second divided regions 16b in which the first light sources 11 are turned on and the second light sources 12 are not turned on, and the luminance distribution pattern P2 in the first divided regions 16a in which the first light sources 11 are turned on are approximately equal to each other. Here, in the local dimming control, the backlight is further controlled according to the luminance of the input image data for each divided region 16, and the amount of light transmission from the backlight is corrected for each pixel according to the input image data based on the luminance correction map obtained in advance. If the luminance distribution pattern P1 of the second divided regions 16b and the luminance distribution pattern P2 of the first divided regions 16a are approximately equal to each other, the luminance correction map for each divided region 16 can be made common. Therefore, it is not necessary to obtain the luminance correction map for each divided region 16 in advance. As a result, it is easy to correct the amount of light transmission for each pixel in the local dimming control.

In the first embodiment, as described above, the second portions 35 of the luminance equalizer sheet 30 have lower light transmittance than that of the portions 38 of the luminance equalizer sheet 30 facing portions of the second divided regions 16b that are located opposite to the corner portions 15 along edges of the arrangement region 14. With this configuration, the luminance distribution can be further adjusted to be uniform by the second portions 35, which form the corner low transmittance areas 36, and the portions 38 of the luminance equalizer sheet 30, which have higher light transmittance than the second portions 35.

In the first embodiment, as described above, the luminance equalizer sheet 30 has the plurality of the through holes 31. The corner low transmittance areas 36 have an aperture ratio of the through holes 31 that is smaller than that of the high transmittance areas 37. With this configuration, the corner low transmittance areas 36 and the high transmittance areas 37 can be formed easily.

In the first embodiment, as described above, the corner low transmittance areas 36 are configured such that a hole diameter of the through holes 31 is smaller than in the high transmittance areas 37, or the corner low transmittance areas 36 are configured such that a distance between adjacent through holes 31 is larger than in the high transmittance areas 37. With this configuration, the corner low transmittance areas 36 and the high transmittance areas 37 can be formed more easily.

In the first embodiment, as described above, the luminance of the first light sources 11 and the second light sources 12 is adjusted by a current value, and the first light sources 11 and the second light sources 12 are configured to be driven by the same current value. With this configuration, the lighting control of the second light sources 12 can be made easier compared to the configuration in which the second light sources 12 are driven by a different current value than the first light sources 11, and the time and effort required to set the drive current value of the second light sources 12 can be reduced. Therefore, luminance uniformity can be easily achieved with the luminance equalizer sheet 30.

Second Embodiment

Figure 10:
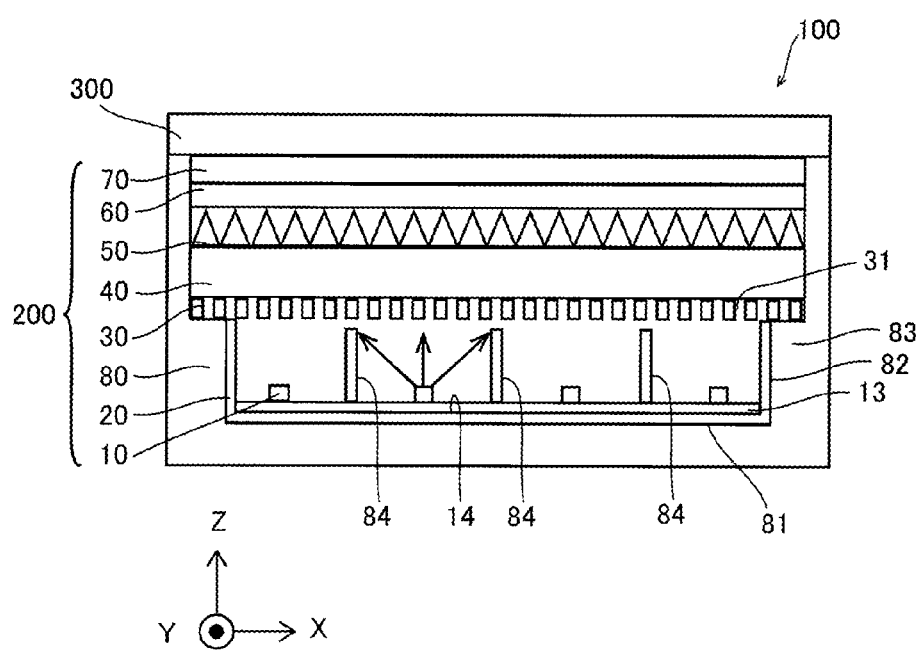
FIG. 10 is a cross-sectional view of a display device according to a second embodiment.

Next, with reference to FIG. 10, the configuration of the display device 100 including the backlight device 200 according to a second embodiment will be described. In the second embodiment, unlike the first embodiment in which the arrangement region 14 is divided into the plurality of the divided regions 16, the arrangement region 14 is divided into the plurality of the divided regions 16, and partition walls 84 are formed between adjacent divided regions 16.

In this embodiment, the partition walls 84 are formed in a grid pattern so as to divide the arrangement region 14 into the plurality of the divided regions 16. The partition walls 84 are formed on the reflective sheet 20.

Other configurations of the second embodiment are similar to the first embodiment above.

Effect of Second Embodiment

In the second embodiment, as described above, the arrangement region 14 further includes the partition walls 84 formed between adjacent divided regions 16. With this configuration, the diffusion of light from a divided region 16 in which a first light source 11 is turned on to an adjacent divided region 16 in which a first light source 11 is not turned on in the local dimming control can be suppressed. Therefore, the contrast in the local dimming control can be further improved.

Other effects of the second embodiment are the same as the first embodiment above.

Modification Examples

The embodiments disclosed here should be considered in all respects to be illustrative and not restrictive. The scope of the invention is indicated by the claims, not by the description of the embodiments described above, and furthermore includes all changes (modification examples) within the meaning and scope equivalent to the claims.

For example, in the first and second embodiments above, an example is shown in which the second light sources 12 are disposed closer to the corners of the arrangement region 14 than the first light sources 11, but the present invention is not limited to this. For example, as in the modification example shown in FIG. 11, the second light sources 12 are disposed further closer to the corners of the arrangement region 14 than the first light sources 11. The closer to the corners of the arrangement region 14 the second light sources 12 are positioned in the second divided regions 16b, the better. The distance d4 from the second light source 12 to the corner of the arrangement region 14 shown in FIG. 11 and the distance d3 from the second light source 12 to the corner of the arrangement region 14 shown in FIG. 3 satisfy the following relationship: d4<d 3. With this configuration, the overlap between the light from the second light source 12 and the light from the first light source 11 closest to this second light source 12 is reduced. Therefore, the pattern design of the luminance equalizer sheet 30 becomes easier, and as a result, the luminance can be easily made uniform.

In the first and second embodiments above, an example is shown in which the second light sources 12 are formed by the LEDs of the same specifications as the first light sources 11, but the present invention is not limited to this. For example, the second light sources 12 can be formed by LEDs having smaller dimensions than the first light sources 11. When the second light sources 12 are the LEDs having smaller dimensions than the first light sources 11, the light transmittance in the corner low transmittance areas 36, which are the second portions 35 of the luminance equalizer sheet 30, should be larger than the light transmittance in the first and second embodiments above.

For example, the second light sources 12 can be driven by the same current value as the first light sources 11 and be LEDs with lower luminous flux than the first light sources 11. When the second light sources 12 are the LEDs with lower luminous flux than the first light sources 11, the light transmittance in the corner low transmittance regions 36, which are the second portions 35 of the luminance equalizer sheet 30, should be larger than the light transmittance in the first and second embodiments above.

In the first and second embodiments above, an example is shown in which the arrangement region 14 and the luminance equalizer sheet 30 have a rectangular shape in the plan view, but the present invention is not limited to this. For example, the arrangement region 14 and the luminance equalizer sheet 30 can be triangular in the plan view, or can be a pentagon or larger polygon in shape.

In the first and second embodiments above, an example is shown in which the number of the first light sources 11 in the first divided regions 16a and the second divided regions 16b is one and the number of the second light sources 12 in the second divided regions 16b is one, but the present invention is not limited to this. For example, the number of the first light sources 11 in the first divided regions 16a and the second divided regions 16b can be two or more, and the number of the second light sources 12 in the second divided regions 16b can be two or more.

In the first and second embodiments above, an example is shown in which the luminance equalizer sheet 30 is configured to have different light transmittance depending on the size of the hole diameter of the through holes 31, but the present invention is not limited to this example. For example, the luminance equalizer sheet 30 can be configured to have different light transmittance by varying the transparency.

(1) In view of the state of the known technology, a display device according to a first aspect of this disclosure comprises a plurality of light sources including a plurality of first light sources arranged in an array on an arrangement region and a plurality of second light sources arranged at corner portions of the arrangement region, respectively, a luminance equalizer sheet arranged opposite the light sources to equalize luminance, the luminance equalizer sheet including first portions that face the first light sources, respectively, and second portions that face the second light sources, respectively, the second portions being different from the first portions, and a display arranged opposite the luminance equalizer sheet and disposed on an opposite side of the luminance equalizer sheet relative to the light sources, the second portions of the luminance equalizer sheet forming corner low transmittance areas with lower light transmittance than a portion of the luminance equalizer sheet other than the first portions that are adjacent to the second portions, respectively, and the second portions.

With the display device according to the first aspect of this disclosure, as described above, the second portions of the luminance equalizer sheet form the corner low transmittance areas with lower light transmittance than the portion of the luminance equalizer sheet other than the first portions that are adjacent to the second portions, respectively, and the second portions. With this configuration, the amount of light transmitted through the second portions facing the second light sources can be adjusted. Therefore, the luminance distribution can be adjusted uniformly by the luminance equalizer sheet. As a result, the display device can be made to have uniform luminance even when light sources are further placed in the corners of the arrangement region on which the light sources are arranged in an array.

(2) In accordance with a preferred embodiment according to the display device mentioned above, the second portions of the luminance equalizer sheet are arranged relative to each other through high transmittance areas that are located between the first portions and the second portions and have higher light transmittance than the second portions. With this configuration, the luminance distribution can be adjusted more uniformly by the corner low transmittance areas of the second portions and the high transmittance areas located between the first portions and the second portions.

(3) In accordance with a preferred embodiment according to any one of the display devices mentioned above, the display device further comprises a controller configured to control emission of light from the light sources, the arrangement region being divided into a plurality of divided regions of the substantially same shape, the divided regions including first divided regions that do not include the corner portions, and second divided regions that include the corner portions, respectively, the first light sources being arranged on the first divided regions and the second divided regions, respectively, the second light sources being arranged on the second divided regions, respectively, when turning on a first light source arranged in a second divided region by local dimming control, the controller being configured not to turn on a second light source arranged in the second divided region in which the first light source to be turned on is arranged. Here, local dimming is a technique that divides the entire screen of the display device into multiple divided regions and controls the backlight device according to the luminance of the input image data for each divided region. If it is configured so that a second light source in a second divided region is not turned on when a first light source in the second divided region is turned on by the local dimming control, it is possible to suppress the difference between the luminance distribution pattern in the second divided region in which the first light source is turned on by the local dimming control and the luminance distribution pattern in a first divided region that does not include the corner portions and in which a first light source is turned on by the local dimming control. Since the local dimming control, for example, does not turn on light sources in divided regions corresponding to display screen areas to be displayed in black, luminance uniformity across the entire display screen is not required during the local dimming control. Therefore, there is no problem even if a second light source in a second divided region is not turned on when a first light source in the second divided region is turned on by the local dimming control.

(4) In accordance with a preferred embodiment according to any one of the display devices mentioned above, the controller is configured to turn on all of the second light sources when turning on all of the first light sources by an off control of the local dimming control. With this configuration, the luminance distribution can be adjusted more uniformly by the luminance equalizer sheet when the local dimming is off.

(5) In accordance with a preferred embodiment according to any one of the display devices mentioned above, a luminance distribution pattern in the second divided region in which the first light source is turned on and the second light source is not turned on, and a luminance distribution pattern in a first divided region in which the first light source is turned on are approximately equal to each other. Here, in the local dimming control, the backlight is further controlled according to the luminance of the input image data for each divided region, and the amount of light transmission from the backlight is corrected for each pixel according to the input image data based on a luminance correction map obtained in advance. If the luminance distribution pattern of the second divided region and the luminance distribution pattern of the first divided region are approximately equal to each other, then the luminance correction map for each divided region can be made common. Therefore, it is not necessary to obtain the luminance correction map for each divided region in advance. As a result, it is easy to correct the amount of light transmission for each pixel in the local dimming control.

(6) In accordance with a preferred embodiment according to any one of the display devices mentioned above, the second portions of the luminance equalizer sheet have lower light transmittance than that of portions of the luminance equalizer sheet facing portions of the second divided regions that are located opposite to the corner portions along edges of the arrangement region. With this configuration, the luminance distribution can be further adjusted to be uniform by the second portions, which form the corner low transmittance areas, and the portions of the luminance equalizer sheet, which have higher light transmittance than the second portions.

(7) In accordance with a preferred embodiment according to any one of the display devices mentioned above, the display device further comprises a partition wall formed between adjacent divided regions. With this configuration, the diffusion of light from a divided region in which a first light source is turned on to an adjacent divided region in which a first light source is not turned on in the local dimming control can be suppressed. Therefore, the contrast in the local dimming control can be further improved.

(8) In accordance with a preferred embodiment according to any one of the display devices mentioned above, the luminance equalizer sheet has a plurality of through holes, and in each of portions of the luminance equalizer sheet corresponding to the first divided regions, a hole diameter of the through holes increases as moving away from the respective one of the first portions.

(9) In accordance with a preferred embodiment according to any one of the display devices mentioned above, in each of portions of the luminance equalizer sheet corresponding to the second divided regions, a hole diameter of the through holes increases as moving away from the respective one of the first portions, except for an area around the respective one of the second portions.

(10) In accordance with a preferred embodiment according to any one of the display devices mentioned above, the luminance equalizer sheet has a plurality of through holes.

(11) In accordance with a preferred embodiment according to any one of the display devices mentioned above, the through holes are arranged in an array.

(12) In accordance with a preferred embodiment according to any one of the display devices mentioned above, the corner low transmittance areas have an aperture ratio of the through holes that is smaller than that of the high transmittance areas. With this configuration, the corner low transmittance areas and the high transmittance areas can be formed easily.

(13) In accordance with a preferred embodiment according to any one of the display devices mentioned above, the corner low transmittance areas are configured such that a hole diameter of the through holes is smaller than in the high transmittance areas, or the corner low transmittance areas are configured such that a distance between adjacent through holes is larger than in the high transmittance areas. With this configuration, the corner low transmittance areas and the high transmittance areas can be formed more easily.

(14) In accordance with a preferred embodiment according to any one of the display devices mentioned above, luminance of the first light sources and the second light sources is adjusted by a current value, and the first light sources and the second light sources are configured to be driven by the same current value. With this configuration, the lighting control of the second light sources can be made easier compared to the configuration in which the second light sources are driven by a different current value than the first light sources, and the time and effort required to set the drive current value of the second light sources can be reduced. Therefore, luminance uniformity can be easily achieved with the luminance equalizer sheet.

(15) In view of the state of the known technology, a backlight device according to a second aspect of this disclosure comprises a plurality of light sources including a plurality of first light sources arranged in an array on an arrangement region and a plurality of second light sources arranged at corner portions of the arrangement region, respectively, a luminance equalizer sheet arranged opposite the light sources to equalize luminance, the luminance equalizer sheet including first portions that face the first light sources, respectively, and second portions that face the second light sources, respectively, the second portions being different from the first portions, the second portions of the luminance equalizer sheet forming corner low transmittance areas with lower light transmittance than a portion of the luminance equalizer sheet other than the first portions that are adjacent to the second portions, respectively, and the second portions.

With the backlight device according to the second aspect of this disclosure, as in the first aspect above, the second portions of the luminance equalizer sheet form the corner low transmittance areas with lower light transmittance than the portion of the luminance equalizer sheet other than the first portions that are adjacent to the second portions, respectively, and the second portions. With this configuration, the amount of light transmitted through the second portions facing the second light sources can be adjusted. Therefore, the luminance distribution can be adjusted uniformly by the luminance equalizer sheet. As a result, the luminance can be made uniform even when light sources are further placed in the corners of the arrangement region on which the light sources are arranged in an array.

(16) In accordance with a preferred embodiment according to any one of the display devices mentioned above, the light sources include light emitting diodes.

(17) In accordance with a preferred embodiment according to any one of the display devices mentioned above, the display device further comprises a frame having a bottom surface that defines the arrangement region.

(18) In accordance with a preferred embodiment according to any one of the display devices mentioned above, the second light sources are located outward relative to the first light sources with respect to a center of the display device.

(19) In accordance with a preferred embodiment according to any one of the display devices mentioned above, each of the first light sources is arranged at a center of the respective one of the divided regions.

(20) In accordance with a preferred embodiment according to any one of the display devices mentioned above, each of the second light sources is offset from a center of the respective one of the second divided regions According to the present disclosure, as described above, it is possible to provide a display device and a backlight device capable of achieving uniform luminance even when further light sources are placed in the corners of the arrangement region of the light sources arranged in an array.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position on a horizontal surface. Accordingly, these directional terms, as utilized to describe the display device should be interpreted relative to a display device in an upright position on a horizontal surface. The terms "left" and "right" are used to indicate the "right" when referencing from the right side as viewed from the front side of the display device, and the "left" when referencing from the left side as viewed from the front side of the display device.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
    a plurality of light sources including a plurality of first light sources arranged in an array on an arrangement region and a plurality of second light sources arranged at corner portions of the arrangement region, respectively;
    a luminance equalizer sheet arranged opposite the light sources to equalize luminance and having a plurality of through holes with different hole diameters to equalize luminance, the luminance equalizer sheet including first portions that face the first light sources, respectively, and second portions that face the second light sources, respectively, the second portions being different from the first portions; and
    a display arranged opposite the luminance equalizer sheet and disposed on an opposite side of the luminance equalizer sheet relative to the light sources,
    the second portions of the luminance equalizer sheet forming corner low transmittance areas with lower light transmittance than a portion of the luminance equalizer sheet other than the first portions and the second portions,
    the arrangement region being divided into a plurality of divided regions of the substantially same shape,
    the divided regions including
        first divided regions that do not include the corner portions, and
        second divided regions that include the corner portions, respectively,
    the first light sources being arranged at centers of the first divided regions and the second divided regions in the first divided regions and the second divided regions, respectively, and
    the second light sources being arranged in the second divided regions, respectively.

2. The display device according to claim 1, wherein
    the second portions of the luminance equalizer sheet are arranged relative to each other through high transmittance areas that are located between the first portions and the second portions and have higher light transmittance than the second portions.

3. The display device according to claim 1, further comprising
    a controller configured to control emission of light from the light sources,
    when turning on a first light source arranged in a second divided region by local dimming control, the controller being configured not to turn on a second light source arranged in the second divided region in which the first light source to be turned on is arranged.

4. The display device according to claim 3, wherein
    the controller is configured to turn on all of the second light sources when turning on all of the first light sources by an off control of the local dimming control.

5. The display device according to claim 3, wherein
    a luminance distribution pattern in the second divided region in which the first light source is turned on and the second light source is not turned on, and a luminance distribution pattern in a first divided region in which a first light source is turned on are approximately equal to each other.

6. The display device according to claim 3, wherein
the second portions of the luminance equalizer sheet have lower light transmittance than that of portions of the luminance equalizer sheet facing portions of the second divided regions that are located opposite to the corner portions along edges of the arrangement region.

7. The display device according to claim 3, further comprising
a partition wall formed between adjacent divided regions.

8. The display device according to claim 3, wherein
in each of portions of the luminance equalizer sheet corresponding to the first divided regions, a hole diameter of the through holes increases as moving away from the respective one of the first portions.

9. The display device according to claim 8, wherein
in each of portions of the luminance equalizer sheet corresponding to the second divided regions, a hole diameter of the through holes increases as moving away from the respective one of the first portions, except for an area around the respective one of the second portions.

10. The display device according to claim 3, wherein
each of the second light sources is offset from a center of the respective one of the second divided regions.

11. The display device according to claim 1, wherein
the through holes are arranged in an array.

12. The display device according to claim 1, wherein
the corner low transmittance areas have an aperture ratio of the through holes that is smaller than that of the high transmittance areas.

13. The display device according to claim 12, wherein
the corner low transmittance areas are configured such that a hole diameter of the through holes is smaller than in the high transmittance areas, or the corner low transmittance areas are configured such that a distance between adjacent through holes is larger than in the high transmittance areas.

14. The display device according to claim 1, wherein
luminance of the first light sources and the second light sources is adjusted by a current value, and the first light sources and the second light sources are configured to be driven by the same current value.

15. The display device according to claim 1, wherein
the light sources include light emitting diodes.

16. The display device according to claim 1, further comprising
a frame having a bottom surface that defines the arrangement region.

17. The display device according to claim 1, wherein
the second light sources are located outward relative to the first light sources with respect to a center of the display device.

18. A backlight device comprising:
a plurality of light sources including a plurality of first light sources arranged in an array on an arrangement region and a plurality of second light sources arranged at corner portions of the arrangement region, respectively;
a luminance equalizer sheet arranged opposite the light sources to equalize luminance and having a plurality of through holes with different hole diameters to equalize luminance, the luminance equalizer sheet including first portions that face the first light sources, respectively, and second portions that face the second light sources, respectively, the second portions being different from the first portions,
the second portions of the luminance equalizer sheet forming corner low transmittance areas with lower light transmittance than a portion of the luminance equalizer sheet other than the first portions and the second portions,
the arrangement region being divided into a plurality of divided regions of the substantially same shape,
the divided regions including
first divided regions that do not include the corner portions, and
second divided regions that include the corner portions, respectively,
the first light sources being arranged at centers of the first divided regions and the second divided regions in the first divided regions and the second divided regions, respectively, and
the second light sources being arranged in the second divided regions, respectively.

19. A display device comprising:
a plurality of light sources including a plurality of first light sources arranged in an array on an arrangement region and a plurality of second light sources arranged at corner portions of the arrangement region, respectively;
a luminance equalizer sheet arranged opposite the light sources to equalize luminance and having a plurality of through holes with different hole diameters to equalize luminance, the luminance equalizer sheet including first portions that face the first light sources, respectively, and second portions that face the second light sources, respectively, the second portions being different from the first portions;
a display arranged opposite the luminance equalizer sheet and disposed on an opposite side of the luminance equalizer sheet relative to the light sources; and
a controller configured to control emission of light from the light sources,
the second portions of the luminance equalizer sheet forming corner low transmittance areas with lower light transmittance than a portion of the luminance equalizer sheet other than the first portions and the second portions,
the arrangement region being divided into a plurality of divided regions of the substantially same shape, the divided regions including first divided regions that do not include the corner portions, and second divided regions that include the corner portions, respectively,
the first light sources being arranged on the first divided regions and the second divided regions, respectively,
the second light sources being arranged on the second divided regions, respectively,
when turning on a first light source arranged in a second divided region by local dimming control, the controller being configured not to turn on a second light source arranged in the second divided region in which the first light source to be turned on is arranged,
each of the first light sources being arranged at a center of the respective one of the divided regions.

* * * * *